(12) United States Patent
Hirakata et al.

(10) Patent No.: US 7,438,146 B2
(45) Date of Patent: Oct. 21, 2008

(54) MOVING OBJECT MOUNTING FUEL CELL

(75) Inventors: Shuji Hirakata, Susono (JP); Kenji Umayahara, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 176 days.

(21) Appl. No.: 11/253,608

(22) Filed: Oct. 20, 2005

(65) Prior Publication Data

US 2006/0042845 A1    Mar. 2, 2006

Related U.S. Application Data

(63) Continuation of application No. PCT/JP2004/004934, filed on Apr. 5, 2004.

(30) Foreign Application Priority Data

Apr. 22, 2003    (JP) ............................. 2003-116524

(51) Int. Cl.
  *B60K 6/32* (2007.10)
(52) U.S. Cl. ..................... 180/65.3; 180/65.1
(58) Field of Classification Search ....... 180/65.1–65.3; 701/22
  See application file for complete search history.

(56) References Cited

U.S. PATENT DOCUMENTS 6,672,415 B1 * 1/2004 Tabata ..................... 180/65.2
2004/0048118 A1 * 3/2004 Nakaji et al. .................. 429/22
2004/0062963 A1    4/2004 Umayahara et al.
2004/0229097 A1   11/2004 Hirakata et al.
2007/0015016 A1 * 1/2007 Aoyama et al. ............... 429/22

FOREIGN PATENT DOCUMENTS

| JP | A 05-095607 | 4/1993 |
| JP | A 07-169476 | 7/1995 |
| JP | A 11-214025 | 8/1999 |
| JP | A 2000-292195 | 10/2000 |
| JP | A 2000-303836 | 10/2000 |
| JP | A 2001-224105 | 8/2001 |
| JP | A 2001-231108 | 8/2001 |

* cited by examiner

*Primary Examiner*—Christopher Ellis
*Assistant Examiner*—Vaughn T Coolman
(74) *Attorney, Agent, or Firm*—Oliff & Berridge, PLC

(57) ABSTRACT

When a request to stop an operation of a fuel cell system is issued, a control unit stops the operation of the fuel cell system and cuts off the electrical connection between the fuel cell and a drive motor by shutting OFF a power supply relay. Where a shift position signal indicating that the shift position SP is at the P or N position is received from a shift selector and the parking brake is set, the control unit determines whether a coolant temperature Tfc detected via coolant detection sensors is at or below 20° C. If it is determined that the detected coolant temperature Tfc is at or below 20° C., the control unit commences a temperature-maintenance operation process.

8 Claims, 3 Drawing Sheets

MOVING OBJECT MOUNTING FUEL CELL

CROSS-REFERENCE TO RELATED APPLICATIONS

This is a Continuation Application of International Application No. PCT/JP2004/004934, filed Apr. 5, 2004, which claims priority from Japanese Patent Application No. 2003-116524, filed Apr. 22, 2003, the entire disclosures of which are incorporated herein in their entireties.

BACKGROUND

The present invention relates to a technology for maintaining the temperature of a fuel cell system that operates intermittently.

In a fuel cell system, because electric power is generated by the chemical reaction between hydrogen and oxygen, water is generated during electric power generation. When the fuel cell system operation is stopped and the temperature of the fuel cell system falls below the freezing temperature, the water remaining in the fuel cell system freezes, thereby potentially blocking the hydrogen and air supply paths and causing freezing of the electrolyte membrane.

In a moving object in which the fuel cell system is installed, such as a vehicle, because the fuel cell system operates intermittently, when operation of the fuel cell system is stopped, the temperature of the fuel cell system may fall below the temperature at which water freezes. Accordingly, in a moving object, during a suspension of an operation of the fuel cell system, a temperature-maintenance operation of the fuel cell system is carried out in order to maintain the temperature of the fuel cell system at a temperature higher than the freezing temperature of water.

However, because the fuel cell continues to generate power when the temperature-maintenance operation is underway, power can continue to be supplied to the generator that outputs the drive power for the moving object, which may cause the moving object to move.

SUMMARY

The present invention was invented in order to resolve the above problems, and an object thereof is to reliably prevent the movement of a moving object during a temperature-maintenance operation of a fuel cell system.

In order to attain the above object, a first aspect of the present invention provides a moving object that equips a fuel cell. The moving object of the first aspect of the present invention includes a fuel cell system that includes the above fuel cell, a switch that starts and stops the moving object, a movability determination module that determines whether the moving object is in an immovable state, and a temperature-maintenance operation control module that detects a request to stop the fuel cell system via the switch, and when the movability determination module determines the moving object is in an immovable state and the temperature-maintenance operation control module detects a request to stop the fuel cell system, the temperature-maintenance control module controls the operation state of the fuel cell such that the fuel cell system is maintained at or above a predetermined temperature.

According to the moving object pertaining to the first aspect of the present invention, because the fuel cell is operated to maintain the fuel cell system at or above a predetermined temperature when the fuel cell system is under stoppage and the movability determination module determines the moving object is in an immovable state, movement of the moving object while temperature-maintenance operation of the fuel cell system is underway may be more reliably prevented.

The moving object pertaining to the first aspect of the present invention may further include alarm module that issues an alarm, when the movability determination module determines the moving object is in a movable state and a request for the stoppage of the fuel cell system is detected. In this case, because the user may be prompted to put the moving object in an immovable state, a reduction in opportunities for the fuel cell system to undergo the temperature-maintenance operation caused by the fact that the moving object is in a movable state may be minimized or prevented.

In the moving object pertaining to the first aspect of the present invention, the moving object may have a motive energy cutoff device that mechanically cuts off the transmission of motive energy to drive wheels, a generator that converts electric power generated by the fuel cell to motive energy to the drive wheels, a cutoff circuit that electrically cuts off supply of power to the generator and a parking brake, wherein the movability determination module determines that the moving object is in an immovable state in any of the following cases: (a) when the transmission of the motive energy is mechanically cut off by the motive energy cutoff device, (b) when the supply of the electric power is electrically cut off by the cutoff circuit, and (c) when the parking brake is ON. When the transmission of motive energy from the generator to the drive wheels is mechanically cut off, movement of the moving object may be prevented even if the generator operates. Furthermore, when the supply of electric power to the generator is cut off electrically, because the generator that generates electric power that is supplied to the drive wheels does not operate, the moving object may be prevented from moving even if electric power is generated by the fuel cell.

In the moving object pertaining to the first aspect of the present invention, the temperature-maintenance operation control module may include detection module that detects a measurement value associated with the internal temperature of the fuel cell and the temperature-maintenance operation control module maintains the internal temperature of the fuel cell within a predetermined temperature range using the measurement value detected by the detection module. In a fuel cell system, because the fuel cell is most affected by the freezing of the water, the temperature-maintenance operation may be carried out most effectively by maintaining the fuel cell temperature within a predetermined temperature range.

A second aspect of the present invention provides a temperature maintenance control method for a fuel cell system that includes a fuel cell in a moving object. The temperature control method pertaining to the second aspect of the present invention includes determining whether the moving object is in an immovable state, determining whether a request to stop the fuel cell system is input via a switch used to stop or start the moving object; and when determining a request to stop the fuel cell system is input and the moving object is in an immovable state, controlling the operation state of the fuel cell such that the fuel cell system is maintained within a predetermined temperature range.

According to the temperature maintenance control method pertaining to the second aspect of the present invention, the same operation and effect as those obtained for the moving object of the first aspect of the present invention may be obtained. Furthermore, the temperature maintenance control method pertaining to the second aspect of the present invention may be implemented in various ways, as with the moving object pertaining to the first aspect of the present invention.

BRIEF DESCRIPTION OF THE DRAWINGS

Various exemplary embodiments or the invention will be described with reference to the drawings, wherein.

DETAILED DESCRIPTION OF PREFERRED EMBODIMENTS

A moving object in which a fuel cell is installed pertaining to the present invention and a temperature-maintenance operation control method for a fuel cell system in a moving object in which the fuel cell system is incorporated pertaining to the present invention are described below with reference to the drawings.

Figure 1:
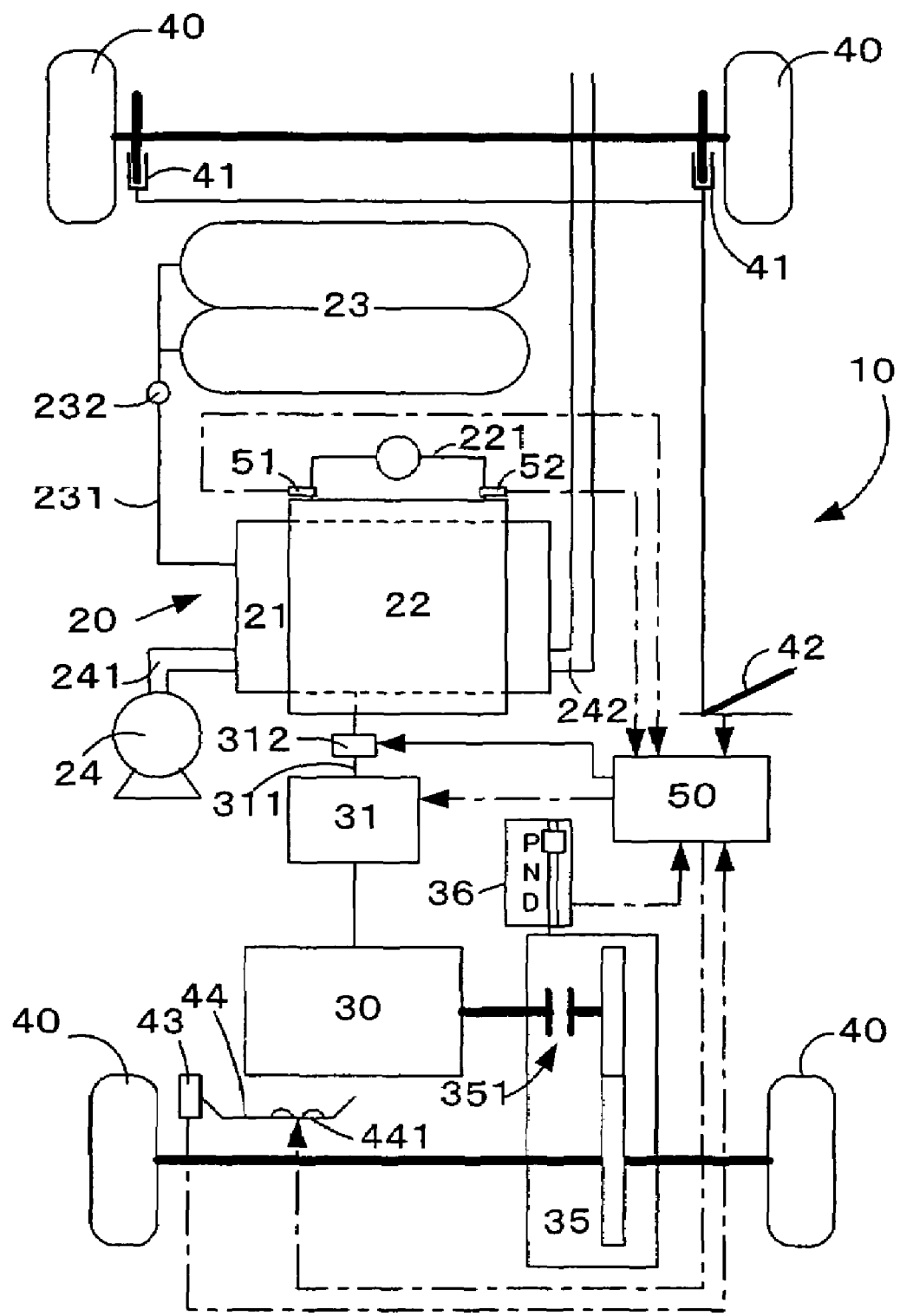
FIG. 1 is an explanatory drawing showing the basic configuration of a moving object in which the fuel cell system is incorporated pertaining to this embodiment.

A moving object (vehicle) in which a fuel cell system pertaining to an embodiment is installed is described with reference to FIG. 1. FIG. 1 is an explanatory drawing showing the basic configuration of a moving object in which the fuel cell system is installed pertaining to the embodiment.

The fuel cell system-equipped vehicle 10 includes a fuel cell system 20 operating as a power supply system, a drive motor (engine) 30 that converts the electric power obtained from the fuel cell system into motive energy, wheels 40 that are driven by the drive motor 30 and a control unit 50 that controls the operation of the vehicle 10.

The fuel cell system 20 includes a fuel cell 21 that consumes hydrogen gas (hydrogen-containing gas) as a fuel and generates electric power, a heat exchanger 22 that cools the fuel cell 21 during operation thereof, a high-pressure hydrogen pump 23 that stores hydrogen to be supplied to the fuel cell 21, and an air pump 24 that supplies air to the fuel cell 21. A secondary battery not shown that can store and discharge electric power may also be included.

The fuel cell 21 and the high-pressure hydrogen pump 23 are connected via a hydrogen supply tube 231, and a pressure-reducing valve 232 that reduces the hydrogen pressure to the supply pressure at which hydrogen is supplied to the fuel cell 21 is disposed on the hydrogen supply tube 231. The fuel cell 21 and the air pump 24 are connected by an air supply tube 241. Moreover, the air supplied to the fuel cell 21 is output to the atmosphere via an exhaust tube 242.

The heat exchanger 22 is incorporated in the fuel cell 21 in order to cool the fuel cell 21, and coolant circulates in the interior thereof. Coolant temperature sensors 51, 52 that detect coolant temperature are disposed in an external coolant circulation tube 221 located at the coolant inlet and/or coolant outlet of the heat exchanger 22.

The drive motor 30 is a three-phase synchronous motor, for example, and includes a rotor having multiple permanent magnets on its outer circumferential surface and a stator around which is wound a three-phase coil that forms a rotating magnetic field. The operation of the drive motor 30 is controlled by an inverter 31 that receives control signals from the control unit 50. The inverter 31 and the fuel cell 21 are connected by a power supply line 311, and a power supply relay 312, that electrically severs (cuts off) the connection between the fuel cell 21 and the drive motor 30, is disposed in the center of the power supply line 311.

The drive motor 30 is connected to the wheels 40 by a gear mechanism 35 that includes a clutch mechanism 351. The gear mechanism 35 is electrically or mechanically connected to a shift selector 36 that selects the gear position (shift position SP). The clutch mechanism 351 mechanically disengages (cuts off) the connection between the drive motor 30 and the wheels 40 if P (Park) or N (Neutral) is selected as the shift position SP of the shift selector 36.

The drive motor 30 rotates via the interaction of the magnetic field created by the permanent magnets of the rotor and the magnetic field formed by the three-phase coil of the stator and outputs required motive energy to the wheels 40. Where a transmission downshift request (brake request) is issued, the drive motor 30 functions as a generator brake that, by driving the rotor using external force, generates electromotive power at both ends of the three-phase coil via the interaction of these magnetic fields.

The vehicle 10 also includes a parking brake 42 that, when the vehicle is parked, prevents the vehicle 10 from moving by placing the brake 41 in the braked position, a switch (ignition switch) 43 that starts and stops the vehicle 10, and an instrument panel 44 that includes a speedometer/warning lamp 441 and the like.

The control unit 50 includes a central processing unit (CPU), storage devices (a RAM and/or ROM) and the like, which are not shown, and controls the operation of the vehicle 10 in accordance with the drive state thereof. The control unit 50 implements the movability determination module and the temperature-maintenance operation control module. Shift position signals indicating the shift position SP selected via the shift selector 36, parking brake ON/OFF signals indicating the state of the parking brake 42, ignition position signals indicating the ignition position of the switch 43 and detected temperature signals from the coolant temperature sensors 51, 52 are input to the control unit 50 via signal lines.

The control unit 50 sends control signals to control the drive motor to the inverter 31, as well as sends cutoff/connection signals to the power supply relay 312 and alarm signals to the warning lamp 441.

Figure 2:
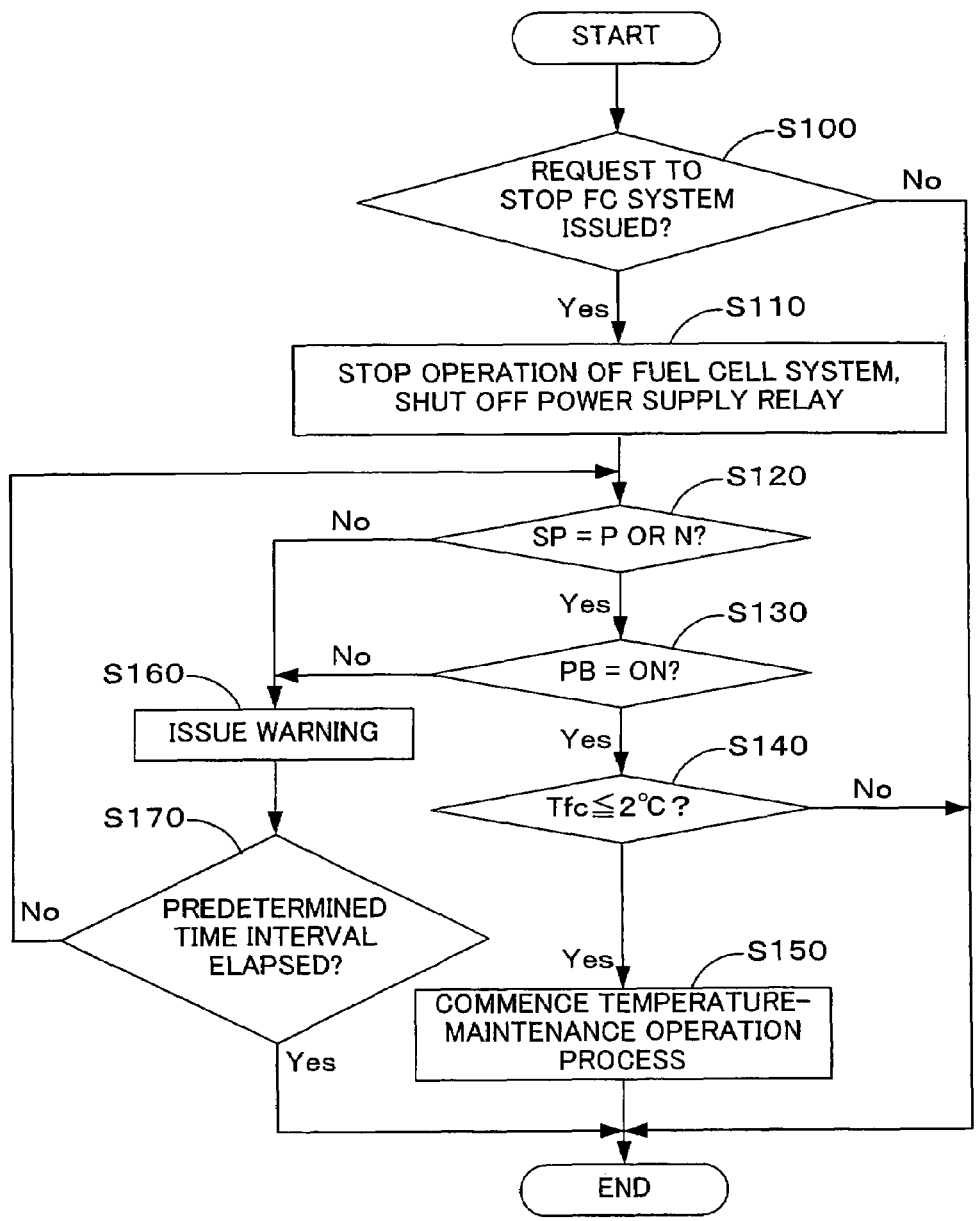
FIG. 2 is a flow chart showing the processing routine for a temperature-maintenance operation control process for fuel cell system executed in a vehicle pertaining to this embodiment.
Figure 3:
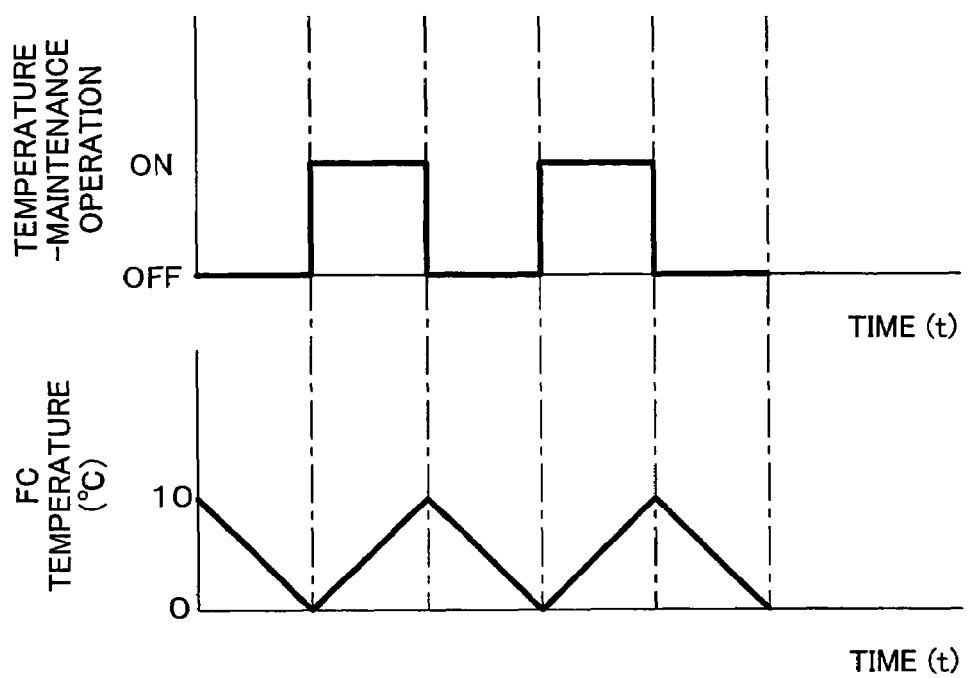
FIG. 3 is an explanatory drawing that explains temperature-maintenance operation control and shows the relationship between temperature-maintenance operation and fuel cell temperature.

Temperature-maintenance operation control for the fuel cell system, which is executed in the vehicle 10 pertaining to this embodiment, will now be described with reference to FIGS. 2 and 3. FIG. 2 is a flow chart showing the processing routine for the fuel cell system temperature-maintenance operation control process executed in the vehicle pertaining to this embodiment. FIG. 3 is an explanatory drawing that explains such temperature-maintenance operation control by showing the relationship between the temperature-maintenance operation and the temperature of the fuel cell (FC) 21.

This processing routine is repeatedly executed at predetermined time intervals. The control unit 50 determines whether or not a request to stop an operation of the fuel cell system 20 has been issued (step S100). Specifically, this is determined based on whether or not the user (driver) has turned OFF the switch 43. Because temperature-maintenance operation control for the fuel cell system 20 is intended to maintain the fuel cell system 20, and particularly the fuel cell 21, at a temperature at least equal to the freezing temperature of water when operation of the fuel cell system 20 has stopped, a request to stop operation of the fuel cell system 20 is the trigger to commence processing.

Where it is determined that the switch 43 is OFF, i.e., where it is determined that a request to stop operation of the fuel cell system 20 has been issued (YES in step S100), the control unit 50 stops operation of the fuel cell system 20 and shuts off the power supply relay 312 (step S110), and electrically terminates the connection between the fuel cell 21 and the drive motor 30. This is done in order to avoid a situation in which the drive motor 30 operates based on electric power that is generated during temperature-maintenance operation control and supplied to the drive motor 30. After the switch 43 is turned OFF, the control unit 50 is in the operating state, such that it can start and stop the fuel cell system 20 as needed.

Where it is determined that the switch 43 is not OFF, i.e., where it is determined that a request to stop operation of the fuel cell system 20 has not been issued (NO in step S100), the control unit 50 ends this processing routine. In other words, temperature-maintenance operation control for the fuel cell system 20 is not performed.

The control unit 50 then determines whether or not a shift position signal indicating that the shift position SP is at the P or N position has been received from the shift selector 36 (step S120). In other words, it determines whether or not the connection between the drive motor 30 and the wheels 40 has been mechanically terminated (severed).

Where it is determined that the shift position SP is either P or N (YES in step S120), the control unit 50 determines whether or not the parking brake has been set, i.e., whether or not the parking brake signal PB is ON (step S130). In other words, it determines whether or not the brake 41 has been set in the brake position by the parking brake 42, and whether or not the vehicle 10 (specifically, the wheels 40) is prevented from moving.

If it is determined that the parking brake 42 is set, i.e., that PB=ON (YES in step S130), the control unit 50 determines whether or not the coolant temperature Tfc detected by the coolant temperature sensors 51, 52 is equal to or less than 2° C. (step S140). In other words, the control unit 50 determines whether or not the fuel cell system 20 is in danger of freezing. Here, 2° C. is used as the temperature for this determination because the temperature of the fuel cell system 20, and particularly the fuel cell 21, is determined by the coolant temperature sensors 51, 52, local variations in temperature must be taken into account. If a temperature sensor that directly detects the internal temperature of the fuel cell 21 is placed in the fuel cell 21, for example, the determination temperature could be 0° C., and any temperature between 0° C. and 5° C. could be used. In either case, any configuration is acceptable so long it is ensured that the temperature of the fuel cell 21 does not fall below 0° C. at any location thereof.

Where it is determined that the detected coolant temperature Tfc is 2° C. or less (YES in step S140), the control unit 50 begins the temperature-maintenance operation process (step S150) and ends this routine.

The temperature-maintenance operation process for the fuel cell system 20 will be briefly described below with reference to FIG. 3. The temperature-maintenance operation process is performed in order to maintain the fuel cell system 20, and more specifically, the temperature of the fuel cell 21, within a predetermined temperature range. As shown in FIG. 3, when the FC temperature comprising the temperature of the fuel cell 21 approaches 0° C., the control unit 50 begins temperature-maintenance operation (ON) i.e., starts up the fuel cell system 20, and commences the generation of electric power from the fuel cell 21. When the fuel cell 21 begins power generation, heat is generated due to the electrogenic reaction that occurs as electric power is generated. As a result, the temperature of the fuel cell 21 rises and the water in the fuel cell system 20 (i.e., the fuel cell 21) can be prevented from freezing.

From the standpoint of preventing freezing of the fuel cell system 20, the temperature of the fuel cell system 20 may be any temperature equal to or higher than 0° C., but in order to minimize the consumption of fuel during the temperature-maintenance operation process, the operation of the fuel cell system 20 is stopped when the temperature of the fuel cell system 20 reaches an upper limit temperature of 110C, for example. Thereafter, the temperature of the fuel cell system 20 is used as a parameter for the repeated starting and stopping of the operation of the fuel cell system 20.

The electric power generated during temperature-maintenance operation is consumed as power for the driving of auxiliary equipment such as the air pump 24, or where an electric heater is used to heat the fuel cell system 20, such power may be used to heat (insulate) the fuel cell system 20 via this electric heater.

If it is determined that the shift position SP is not at P or N, on the other hand (NO in step S120) and that the parking brake 42 is set, i.e., that PB=ON does not hold true (NO in step S130), the control unit 50 issues a warning (step S160). Specifically, by illuminating or flashing the warning lamp 441 on the instrument panel 44, or by emitting a sound, the control unit 50 prompts the driver to place the shift position at P or N and to set the parking brake.

The control unit 50 then determines whether or not a predetermined time interval has elapsed since the commencement of the alarm (step S170), and if it is determined that the predetermined time interval has not elapsed (NO in step S170), the control unit 50 transitions to the process of step S120. If it determines that the predetermined time interval has elapsed, on the other hand (YES in step S170), the control unit 50 ends this processing routine. In other words, the temperature-maintenance operation process for the fuel cell system 20 is not executed.

As described above, according to the vehicle 10 and the temperature-maintenance operation control method for the fuel cell system 20 installed therein pertaining to this embodiment, the temperature-maintenance operation process for the fuel cell system 20 is commenced only if the connection between the drive motor 30 and the wheels 40 has been mechanically severed and the connection between the fuel cell 21 and the drive motor 30 has been electrically severed. Therefore, even where electric power is generated by the fuel cell 21 during temperature-maintenance operation, the vehicle 10 is electrically and mechanically in an immovable state (i.e., it cannot be driven), and the movement of the vehicle 10 during temperature-maintenance operation can be reliably prevented.

Where the vehicle 10 is in a movable state, because the user (driver) is prompted to change the shift position SP to P or N and to operate the parking brake 42, the vehicle 10 may be changed from a movable state to an immovable state in more instances and the number of opportunities for the execution of the temperature-maintenance operation process regarding the fuel cell system 20 may be increased. As a result, freezing of the fuel cell system 20 can be more reliably prevented.

In the above embodiment, the movable state of the vehicle 10 is determined based on both the selected shift position SP and the state of operation of the parking brake 42, but such determination may be made based on either of these factors individually. In addition, a step of checking whether the power supply relay 312 is OFF may be included.

In the above embodiment, the temperature of the fuel cell 21 is detected using coolant temperature sensors 51, 52, but it is acceptable if temperature sensors are instead placed directly in the fuel cell 21. Furthermore, where multiple temperature sensors to detect the temperature of the fuel cell 21 are used, it is acceptable if the temperature-maintenance operation process is commenced where the detection value for any of these temperature sensors drops below the temperature threshold. In this case, freezing of the fuel cell system 20 may be more reliably prevented. Moreover, the temperature of the fuel cell 21 may be determined based on the atmospheric temperature, surface temperature or the like by associating such temperature beforehand with a corresponding temperature for the fuel cell 21.

While in the above embodiment hydrogen gas stored in a high-pressure hydrogen tank 23 was used as the fuel for the fuel cell 21, any hydrogen-containing gas (reformed gas) obtained using a gas reformer may be used.

The device and method pertaining to the above embodiment may be realized as a computer program or as a recording medium on which such computer program is recorded (such as an electrical, magnetic or optical recording medium).

While the moving object and a temperature-maintenance operation control method for a fuel cell system incorporated in such moving object pertaining to the present invention were described based on various embodiments, the embodiments of the above invention are provided solely in order to aid in understanding thereof, and do not limit the invention in any way. The present invention may naturally be changed or modified within the scope of claims, and includes other configurations or implementations equivalent thereto.

What is claimed is:

1. A moving object equipped with a fuel cell comprising:
   a fuel cell system that includes the fuel cell;
   a switch that starts and stops the moving object;
   a movability determination module that determines whether the moving object is in an immovable state;
   a temperature-maintenance operation control module that detects a request to stop the fuel cell system via the switch, and when the movability determination module determines that the moving object is in the immovable state and the temperature-maintenance operation control module detects the request to stop the fuel cell system, the temperature-maintenance operation control module controls a state of operation of the fuel cell to ensure that the fuel cell system is maintained at or above a predetermined temperature,
   wherein the movability determination module determines that the moving object is in the immovable state at least when supply of electric power is electrically cut off by a cutoff circuit that electrically cuts off a supply of electric power to a generator that converts the electric power generated by the fuel cell to motive energy to drive wheels; and
   an alarm module that issues an alarm when the movability determination module determines that the moving object is in the movable state and the request to stop the fuel cell system is detected.

2. The moving object according to claim 1, wherein the state of operation of the fuel cell is switched from a stopped state to a generating state to ensure that the fuel cell system is maintained at or above the predetermined temperature.

3. The moving object according to claim 1, wherein the temperature-maintenance operation control module includes a detection module that detects a measurement value associated with an internal temperature of the fuel cell and the temperature-maintenance operation control module maintains the internal temperature of the fuel cell within a predetermined temperature range using the measurement value detected by the detection module.

4. The moving object according to claim 1, wherein the moving object has a motive energy cutoff device that mechanically cuts off a transmission of the motive energy to the drive wheels, the generator that converts the electric power generated by the fuel cell to the motive energy for the drive wheels, the cutoff circuit that electrically cuts off the supply of the electric power to the generator and a parking brake, wherein the movability determination module determines that the moving object is in the immovable state when either (a) the transmission of the motive energy is also mechanically cut off by the motive energy cutoff device, or (b) the parking brake is also ON.

5. A temperature control method for a fuel cell system that includes a fuel cell in a moving object, the method comprising:
   determining whether the moving object is in an immovable state;
   determining whether a request to stop the fuel cell system is input via a switch used to start or stop the moving object;
   when determining a request to stop the fuel cell system is input and the moving object is in an immovable state, controlling an operation state of the fuel cell such that the fuel cell system is maintained within a predetermined temperature range,
      wherein the moving object is determined to be in the immovable state at least when supply of electric power is electrically cut off by a cutoff circuit that electrically cuts off a supply of electric power to a generator that converts the electric power generated by the fuel cell to motive energy to drive wheels; and
   issuing an alarm when determining the moving object is in a movable state and the request to stop the operation of the fuel cell system is input.

6. The temperature control method for the fuel cell system according to claim 5, wherein the operation state of the fuel cell is switched from a stopped state to a generating state such that the fuel cell system is maintained within the predetermined temperature range.

7. The temperature control method for the fuel cell system according to claim 5, wherein an operation of the fuel cell to maintain the fuel cell system at or above a predetermined temperature is executed by detecting a measurement value associated with an internal temperature of the fuel cell and maintaining the internal temperature of the fuel cell within the predetermined temperature range using the detected measurement value.

8. The temperature control method for the fuel cell system according to claim 5, wherein the moving object is determined to be in the immovable state when either (a) a transmission of the motive energy is also mechanically cut off by a motive energy cutoff device that mechanically cuts off the transmission of the motive energy to the drive wheels, or (b) a parking brake is also ON.

* * * * *